US011442629B2

(12) United States Patent
Tripathi et al.

(10) Patent No.: US 11,442,629 B2
(45) Date of Patent: Sep. 13, 2022

(54) I/O PERFORMANCE IN A STORAGE SYSTEM

(71) Applicant: International Business Machines Corporation, Armonk, NY (US)

(72) Inventors: Sanjay Tripathi, Pune (IN); Kushal S. Patel, Pune (IN); Rohan Mohan Salvi, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 16/929,227

(22) Filed: Jul. 15, 2020

(65) Prior Publication Data

US 2022/0019352 A1    Jan. 20, 2022

(51) Int. Cl.
*G06F 13/14* (2006.01)
*G06F 3/06* (2006.01)

(52) U.S. Cl.
CPC ............ *G06F 3/0611* (2013.01); *G06F 3/067* (2013.01); *G06F 3/0607* (2013.01);
(Continued)

(58) Field of Classification Search
CPC ........ G06F 3/061–0659; G06F 11/008; G06F 11/0727; G06F 11/073; G06F 11/3466–3495; G06F 3/0631; G06F 3/0635; G06F 3/0644; G06F 3/067; G06F 13/151; G06F 9/5016; G06F 9/5083; G06F 9/5088; H04L 67/1004; H04L 67/1008; H04L 67/1027; H04L 67/1038
(Continued)

(56) References Cited

U.S. PATENT DOCUMENTS 7,552,280 B1 *  6/2009 Naamad ................ G06F 3/0689
                                                    711/170
8,312,214 B1 * 11/2012 English ................. G06F 1/206
                                                    711/114
(Continued)

OTHER PUBLICATIONS

Disclosed Anonymously, "Method for enhanced application performance consideration in high availability storage architecture like HyperSwap in network congestion and method thereof", 4 pages, Aug. 10, 2018, IP.com No. IPCOM000254897D.
(Continued)

*Primary Examiner* — Ilwoo Park
(74) *Attorney, Agent, or Firm* — Daniel M. Yeates (57) ABSTRACT

A computer-implemented method to reduce Input/Output (I/O) command latency. The method includes receiving, by a first storage pool, a plurality of I/O commands, wherein the first storage pool includes a first throttling limit, and the first throttling limit. The method further includes determining a first processing rate of the first storage pool is at the first throttling limit. The method also includes determining a second processing rate of a second storage pool is below a second throttling limit, wherein the second storage pool is communicatively coupled to the first storage pool. The method includes sending, by the first storage pool to the second storage pool, one or more of the plurality of I/O commands. The method further includes processing, by the second storage pool, the one or more I/O commands of the plurality of I/O commands. The method includes returning processed I/O commands to the host.

19 Claims, 5 Drawing Sheets

(52) U.S. Cl.
CPC .......... *G06F 3/0635* (2013.01); *G06F 3/0644* (2013.01); *G06F 3/0659* (2013.01)

(58) Field of Classification Search
USPC .... 710/5–6, 15–19, 38–39, 60, 74; 711/154, 711/161–162; 714/6.1–6.32, 47.1–47.3; 718/104, 105
See application file for complete search history.

(56) References Cited

U.S. PATENT DOCUMENTS

| | | | |
|---|---|---|---|
| 8,380,947 B2 | 2/2013 | Chiu et al. | |
| 8,751,716 B2 | 6/2014 | Rickard et al. | |
| 8,868,804 B2 | 10/2014 | Gole et al. | |
| 9,304,951 B1 * | 4/2016 | Chatterjee | G06F 11/3034 |
| 10,241,724 B1 * | 3/2019 | Schick | G06F 3/0664 |
| 2008/0270610 A1 * | 10/2008 | John | G06F 16/40 |
| | | | 709/226 |
| 2015/0046668 A1 * | 2/2015 | Hyde, II | G06F 12/00 |
| | | | 711/162 |
| 2017/0222935 A1 * | 8/2017 | Kalman | H04L 43/0888 |
| 2019/0222649 A1 * | 7/2019 | Cheng | G06F 15/17331 |
| 2019/0327313 A1 * | 10/2019 | Chen | G06F 9/5088 |

OTHER PUBLICATIONS

Mell et al., "The NIST Definition of Cloud Computing", Recommendations of the National Institute of Standards and Technology, Special Publication 800-145, Sep. 2011, 7 pages.

\* cited by examiner

I/O PERFORMANCE IN A STORAGE SYSTEM

BACKGROUND

The present disclosure relates to data transfer, and, more specifically, improving efficiency of data transfer in throttled systems.

Modern storage system provide various mechanisms for data replication across multiple storage pools. The replicated data is generally configured to be used as a backup and/or alternative data source that can be used at the time of a natural or human induced disaster as an example.

SUMMARY

Disclosed is a computer-implemented method to reduce Input/Output (I/O) command latency. The method includes receiving, by a first storage pool from a host, a plurality of I/O commands, wherein the first storage pool includes a first throttling limit, and the first throttling limit represents an allotted processing capacity of the first storage pool. The method further includes determining a first processing rate of the first storage pool is at the first throttling limit. The method also includes determining a second processing rate of a second storage pool is below a second throttling limit, wherein the second storage pool is communicatively coupled to the first storage pool. The method includes sending, by the first storage pool to the second storage pool, one or more of the plurality of I/O commands. The method further includes processing, by the second storage pool, the one or more I/O commands of the plurality of I/O commands. The method includes returning, in response to the processing, processed I/O commands to the host.

Further aspects of the present disclosure are directed to a system including a multi pool storage system including a first storage pool and a second storage. The system contains functionality consistent with the method described above. Further aspects of the present disclosure are directed to computer program products that contains functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Modern storage systems provide various mechanisms for data replication across multiple storage pools. The replicated data is generally configured to be used as a backup and/or alternative data source that can be used at the time of a natural or human induced disaster, as an example.

In order to reduce I/O latency, embodiments of the present disclosure may alter I/O command flow between various data pools based on availability of throttled processing capacity.

The following acronyms may be used below:
API application program interface
ARM advanced RISC machine
CD—compact disc ROM
ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network Cloud Computing in General It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
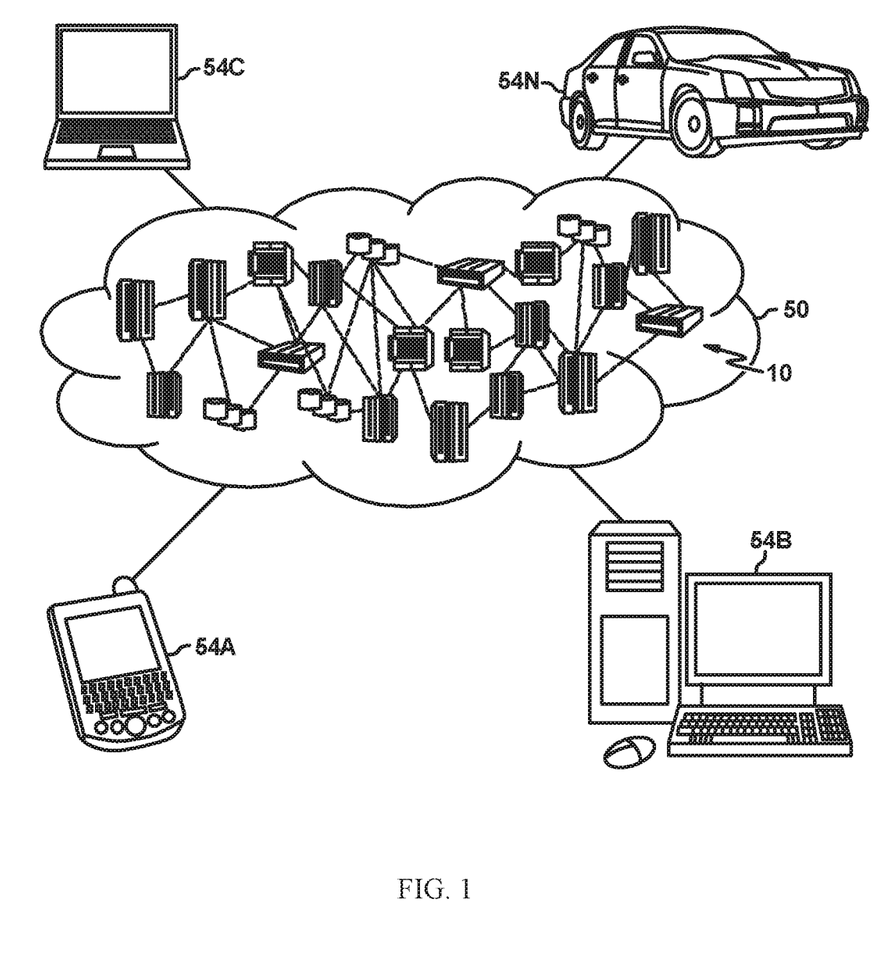
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
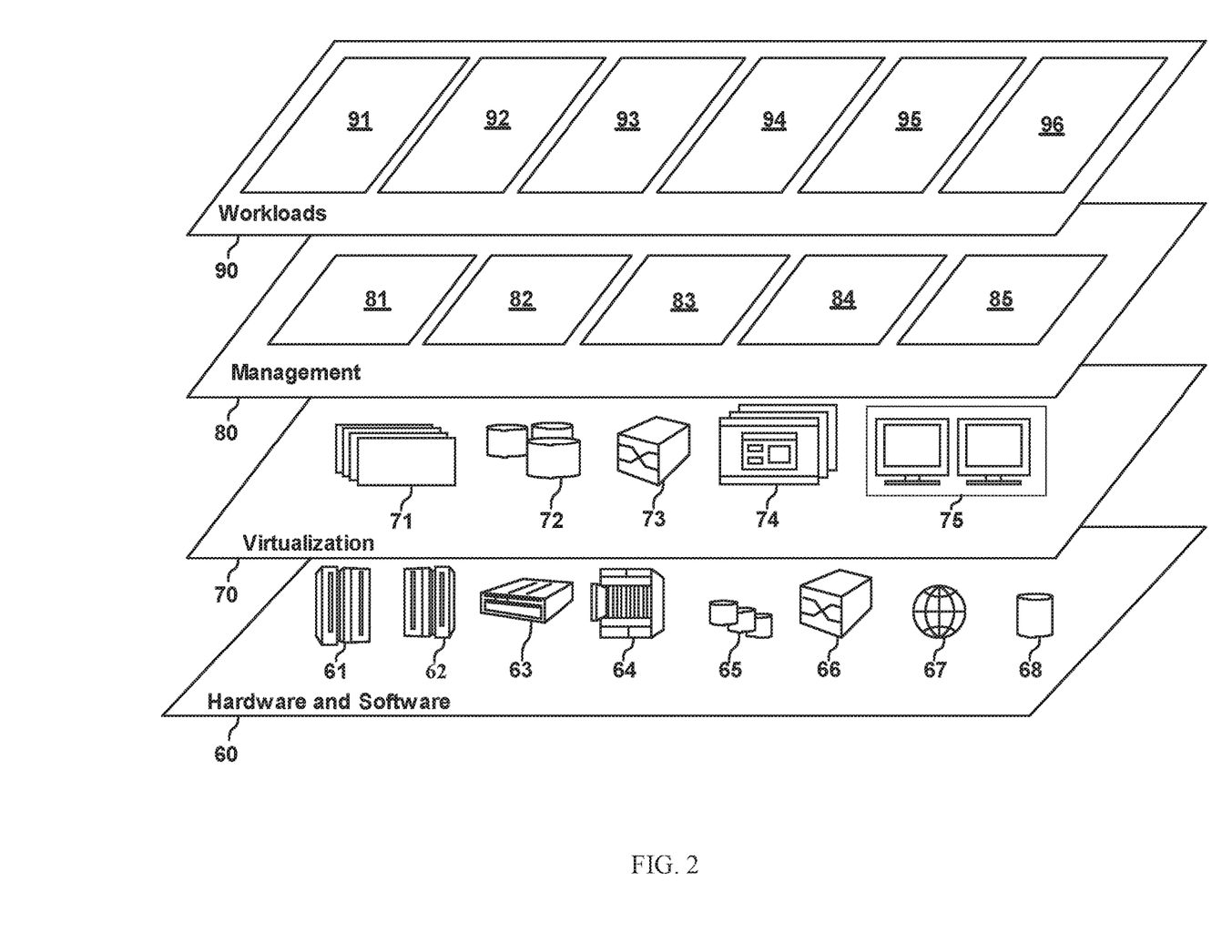
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System in General

Figure 3:
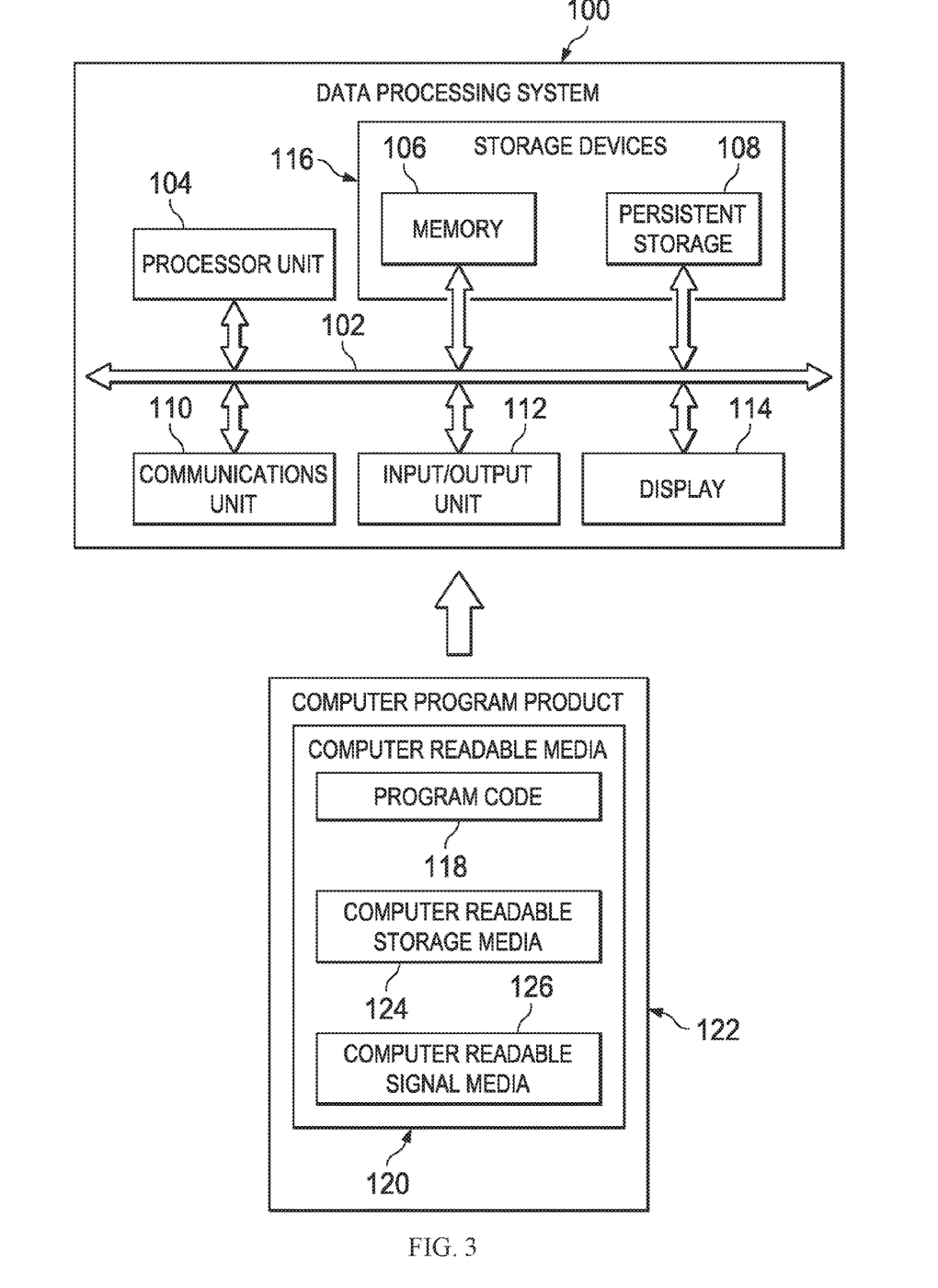
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100 and other components shown in FIG. 1

Improving I/O Performance in Storage Systems

Modern storage systems provide various mechanisms for data replication across multiple storage pools. Some embodiments are designed for high availability of the data that can be obtained/stored at multiple sites in response to an emergency. The storage system can duplicate data to all storage pools automatically via various methods and protocols.

Throttling (or I/O throttling) is a method to control the amount of resources consumed in serving I/Os from a specific volume or host (or clustered host). Upper throttling is a mechanism or technique that ensures a given amount of resources (e.g., bandwidth, input/output per second (IOPS)) is available to a specific host (e.g., a consumer). This can be accomplished by blocking/limiting network traffic from third party (e.g., second host, second consumer). Lower throttling is a mechanism that ensures that a specific host does not exceed a specified amount of IOPS and/or bandwidth.

Storage virtualization systems can contain multiple back-end storage pools. This allows for creation of a large number of volumes which cater to I/Os from large number hosts. However, for purposes of illustration, all I/Os will be discussed as if originating from single host. Different applications/hosts have varied performance requirements. It is possible that a small number of hosts or disks can consume a large amount of controller resources and adversely impact other sets of disks and hosts. Hence, I/O throttling in storage virtualization systems are useful to ensure a certain host does not over utilize resources, or alternatively, that the host has at least a minimum amount of resources to process data.

When a host issues an I/O command to the storage system, it is usually transmitted to a target storage system on a preferred path because of settings on the host. As the host sends major I/O traffic on the preferred path, the majority of the I/Os will be served by the node having preferred path. In some storage systems, the throttle limit of the storage pools at two sites can be different because of differences in the performance of the various storage pools. This may be due to the fact that a user/administrator can configure the volumes for different workloads at primary and secondary sites (e.g., storage pools). For example, at a primary site, the volumes are configured for I/O intensive workloads such as data mining. Also, in the scenario where one site is on-premise and other is in the cloud, they can configure the throttling to limit the I/O on the cloud/secondary site.

Generally, a host (or a requestor) accesses one of the data pools (a target data pool) at a higher rate than the one or more alternate data pools. For example, each write I/O command may be sent to all data pools to ensure the data is consistent across all locations, the read commands are all sent to the target data pool. As all the I/O requests are coming to the target pool, the throttle limit gets exhausted. All the upcoming I/Os are placed in an I/O queue as the throttle limit is reached. This can inject a delay into the processing. All further host application IOs are queued for processing at the target storage pool. As the IOs are queued by the throttling manager, the applications and/or host will start experiencing more I/O latency which can cause the application to act unexpectedly and/or crash. In this case, the alternate storage pool at the secondary site is only receiving write I/Os for data replication and may contain additional processing capacity. But, because the read IOs are not reaching to this pool, the available resources cannot be used effectively.

In some embodiments, the throttling limits can be increased to reduce the queue size. However, this contradicts the purpose of throttling. Embodiments of the present disclosure seek to consider the above limitations.

Embodiments of the present disclosure improve I/O performance in a storage system. In some embodiments, an I/O manager determines when the target (or primary) storage pool is being throttled. This can be based on preset throttling limits and/or a buildup of I/Os in an I/O queue. In some embodiments, the I/O manager determines there is processing capacity in an alternate storage pool. In response to the capacity, the I/O processing is altered.

In some embodiments, I/O commands are sent to the alternate data pool to be processed. This can be based on determining a transfer will result with an overall decrease in processing latency. The latency can be determined by adding the latency of each step in the process (e.g., network latency plus queue waiting time and/or transfer time).

Embodiments of the present disclosure provides an improved mechanism to serve I/O when I/O latency is increased because of I/O throttling by seeking of other paths, which improves overall application I/O performance. Embodiments of the present disclosure improve resource utilization. This can add value to both administrators and users of the storage systems. Users will have lower latency and administrators will have a higher overall efficiency of resource usage. Embodiments of the present disclosure can be implemented on existing hardware without requiring expensive and time consuming upgrades. In some embodiments, the advantages and improvements of this disclosure can be implemented on any system (local or distributed) where I/O data can be replicated across two or more data pools.

The aforementioned advantages are example advantages, and embodiments exist that can contain all, some, or none of the aforementioned advantages while remaining within the spirit and scope of the present disclosure.

Figure 4:
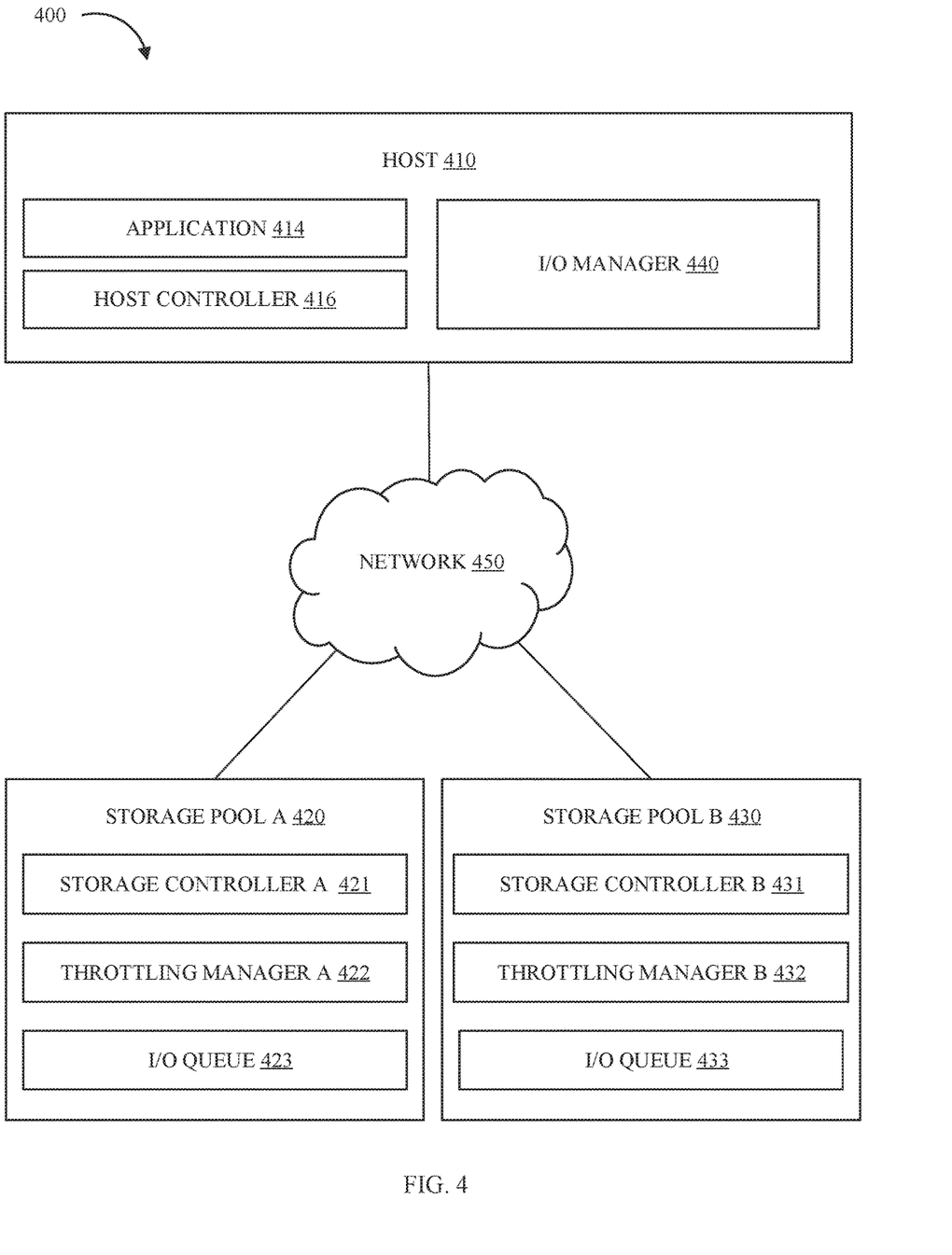
FIG. 4 illustrates a functional diagram of a computing environment suitable for operation of an I/O manager in accordance with some embodiments of the present disclosure.

Referring now to various embodiments of the disclosure in more detail, FIG. 4 is a representation of a computing environment 400, that is capable of running an I/O manager (e.g., I/O manager 440) in accordance with one or more embodiments of the present disclosure. Many modifications to the depicted environment may be made by those skilled in the art without departing from the scope of the disclosure.

Computing environment 400 includes host 410, storage pool A 420, storage pool B 430, and network 450. Network 450 can be, for example, a telecommunications network, a local area network (LAN), a wide area network (WAN), such as the Internet, or a combination of the three, and can include wired, wireless, or fiber optic connections. Network 450 may include one or more wired and/or wireless networks that are capable of receiving and transmitting data, voice, and/or video signals, including multimedia signals that include voice, data, and video information. In general, network 450 may be any combination of connections and protocols that will support communications between host 410, storage pool A 420, storage pool B 430, I/O manager 440, and other computing devices (not shown) within computing environment 400. In some embodiments, host 410, storage pool A 420, and storage pool B 430 may include a computer system, such as the data processing system 100. In some embodiments, host 410, storage pool A 420, and storage pool B 430 are included in a single computing device (e.g., DPS 100), where communication bus 102 acts as the network.

Host 410 can be a standalone computing device, a management server, a web server, a mobile computing device, or any other electronic device or computing system capable of receiving, sending, and processing data. In some embodiments, host 410 can represent a server computing system utilizing multiple computers as a server system, such as cloud computing environment 50. In some embodiments, host 410 represents a computing system utilizing clustered computers and components (e.g., database server computers, application server computers, virtual machines, etc.) that act as a single device. In embodiments, host 410 can be any device or group of devices that are subject to a common throttling configuration. In some embodiments host 410 includes, application 414, host controller 416, and I/O manager 440.

Application 414 can be any combination of hardware and/or software configured to perform a function (e.g., messaging application, etc.) on host 410. In some embodiments, application 414 includes two or more separate applications. Application 414 may be configured to send and/or receive I/O commands to storage pool A 420 and/or storage pool B 430. In some embodiments, application 414 is subject to one or more throttling limits.

Host controller 416 can be any combination of hardware and/or software configured to facilitate the I/O transfers between an initiating device (e.g., host 410) and one or more storage systems (e.g., storage pool A 420). In some embodiments, host controller 416 identifies/selects a preferred storage pool in a multi storage pool environment. The preferred storage pool can be based on location (e.g., onsite vs. offsite, primary power supply v. secondary power, etc.), on a designation (e.g., user selection), storage type, storage speed, available bandwidth, and/or other similar factors. In some embodiments, host controller 416 identifies/determines a network path to send the I/O commands to the destination.

I/O manager 440 can be any combination of hardware and/or software configured monitor and manage IOPS in throttle multi storage pool systems. In some embodiments, I/O manager 440 determines an IOPS and/or MBPS limit is reached (or that a throttle is used to limit IOPS and/or MBPS). I/O manager 440, in response to the throttle being activated, can alter the I/O commands to limit buildup in the queue. The alteration can change which storage pool is the preferred storage pool. The alteration can send I/O commands from the preferred storage pool to an alternate, and have the alternate execute the commands. The alteration may include I/O manager 440 acting as a common controller for all storage pools and can pass I/O commands to pools that have capacity.

In some embodiments, I/O manager 440 can be embedded in one or more of storage pool A 420, and storage pool B 430. In some embodiments, I/O manager 440 is a separate device from host 410, however, it displayed within host 410 for discussion purposes.

Storage pool A 420 can be any combination of hardware and/or software that can execute read, write, and other I/O commands. In some embodiments, storage pool A 420 can be a standalone computing device, a management server, a web server, a mobile computing device, a storage platform, a storage server, or any other electronic device or computing system capable of receiving, sending, and processing data. In some embodiments, storage pool can be a one of many, or a portion (e.g., partition of a database) of a storage medium. In some embodiments, storage pool A 420 includes one or more storage mediums. The storage mediums can be one or more of a solid state drive (SSD), a hard disk drive (HDD), Flash, and/or any other storage medium. In some embodiments, storage pool A 420 includes storage controller A 421, throttling manager A 422, and I/O queue 423.

Storage controller A 421 can be any combination of hardware and/or software configured to facilitate the I/O transfer from an initiating device (e.g., host 410) and storage pool A 420. In some embodiments, primary controller 421 is consistent with host controller 416. In some embodiments, storage controller A 421 determines when I/O reach a throttling limit. The determination can be in coordination with throttling manager 422.

Throttling manager A 422 can be any combination of hardware and/or software configured to ensure a category (e.g., a source, a data type, an application, etc.) IOPS do exceed a predetermined threshold. The threshold may be a high or a low threshold. In some embodiments, throttling manager A 422 sets one or more throttling thresholds/limits. The threshold limits correspond to an allotted and/or allocated amount of resources that can be used by a specific host/application/task. The throttling threshold may include a maximum or minimum of IOPS, megabytes per second (MBPS), or both. In some embodiments, the limits are preset by a user/policy. In some embodiments, throttling manager A 422 generates and/or sends a notification, in response to the one or more thresholds are met, and/or that the throughput is at a limit. The notification can be sent to one or more of storage controller A 421, I/O queue 423, storage pool B 430, and host 410. In some embodiments, the notifications are sent periodically (e.g., once every second, every 1000 cycles, etc.), or based on various events (e.g., storage controller A 421 receiving new I/O commands).

I/O queue 423 can be any combination of hardware and/or software configured to store I/O commands that are waiting to be executed. In some embodiments, I/O queue 423 stores all I/O commands. In some embodiments, I/O queue 423 stores I/O commands being held as a result of throttling. In some embodiments, I/O queue 423 can calculate/estimate an amount of time I/O commands will spend in the I/O queue. This is based on the number of commands in the queue, the rate at which I/O commands are being processed (e.g., throttling limits).

Storage pool B 430 can be any combination of hardware and/or software that can execute read, write, and other I/O commands. In some embodiments, storage pool B 430 is consistent with storage pool A 420. In some embodiments, storage pool B 430 is an alternate storage pool for host 410. For example, the two pools can be a partitioned hard drive on a single machine, or the two or storage pools can be a data center and part of a multi-site storage system (e.g., different geographic locations, or cloud computing environment 50). As another example, two storage system can be on a common site but have different power supplies. In some embodiments, storage pool B 430 includes storage controller B 431, and throttling manager B 432.

Storage controller B 431 can be any combination of hardware and/or software configured to facilitate the I/O transfer from an initiating device (e.g., host 410) and storage pool B 430. In some embodiments, storage controller B 431 can be consistent with storage controller A 421.

Throttling manager B 432 can be any combination of hardware and/or software configured to ensure a category of IOPS do exceed a predetermined threshold. In some embodiments, throttling manager B 432 can be consistent with throttling manager A 421.

I/O queue 433 can be any combination of hardware and/or software configured to store I/O commands that are waiting to be executed. In some embodiments, I/O queue 433 is consistent with I/O queue 423.

Figure 5:
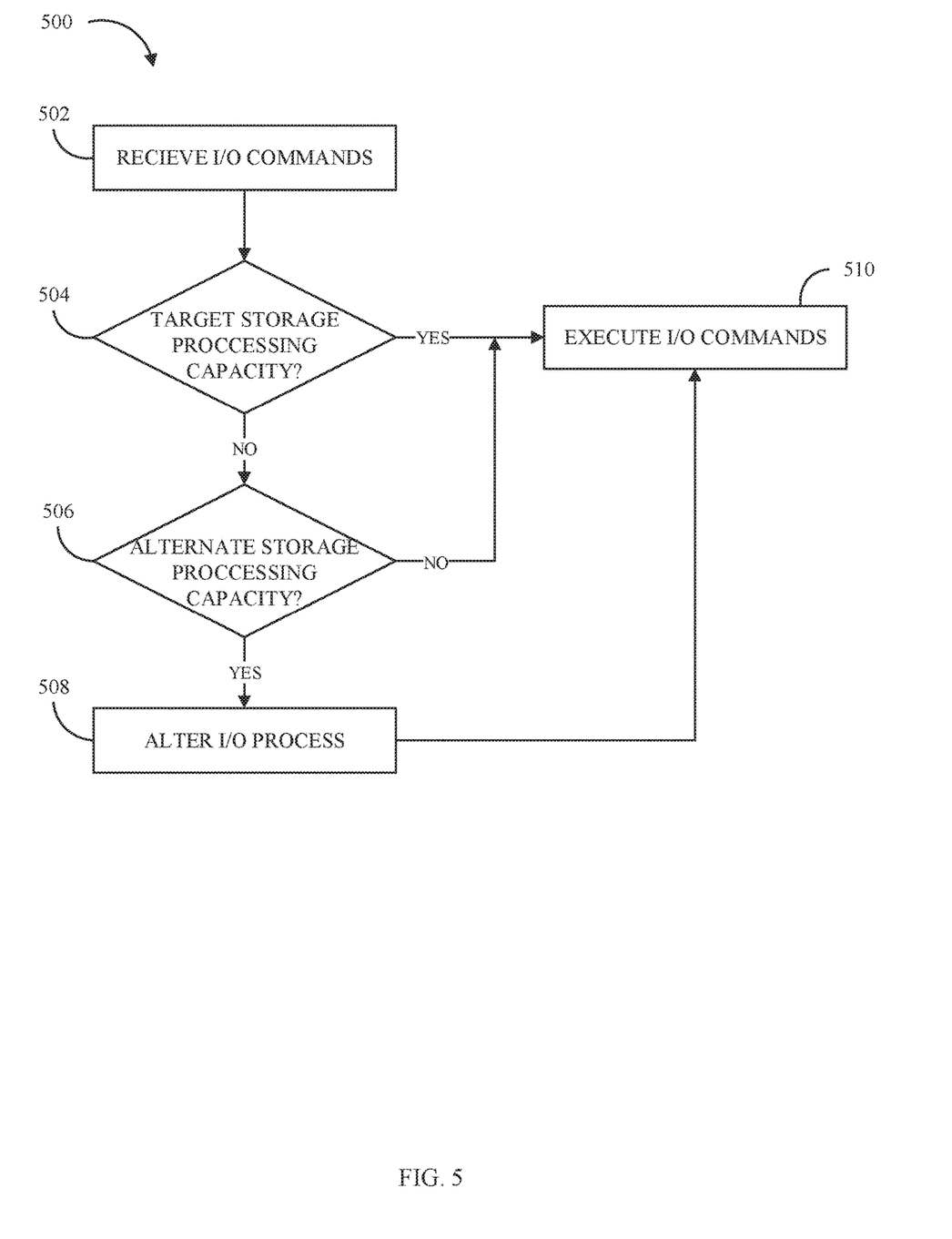
FIG. 5 illustrates a flow chart of an example method to improve I/O performance in throttled systems in accordance with some embodiments of the present disclosure.

FIG. 5 depicts a flowchart of an example method, method 500, for improving I/O performance that can be performed in a computing environment (e.g., computing environment 400 and/or cloud computing environment 50). One or more of the advantages and improvements described above for generating and monitoring usage patterns may be realized by method 500, consistent with various embodiments of the present disclosure.

Method 500 can be implemented by one or more processors, computing environment 400, cloud computing environment 50, and/or a different combination of hardware and/or software. In various embodiments, the various operations of method 500 are performed by one or more of host 410, storage pool A 420, storage pool B 430, I/O manager 440, and/or the subcomponents of the foregoing. For illustrative purposes, the method 500 will be described as being performed by I/O manager 440.

At operation 502, I/O manager 440 receives I/O commands. In some embodiments, the I/O commands are received from host 410. The I/O commands can include read and/or write instruction that are related to an application, a data volume, and/or any other process. In some embodiments, the I/O commands are received by one or more of storage pool A 420 and storage pool B 430. In some embodiments, the I/O commands are received by a local cache within a computing device.

At operation 504, I/O manager 440 determines if the target storage pool (e.g., storage pool A 420) has processing capacity. In some embodiments, the target storage has available processing/throughput capacity if a throttle has not been initiated, or, said differently, the target storage does not have processing capacity if one or more throttles has been invoked. For example, if either of an IOPS throttle or a MBPS throttle is limiting data processing, then a throttle is invoked, and the related storage pool does not have processing capacity. In some embodiments, a throttling manager (e.g., throttling manager A 422) determines if the target has processing capacity. The throttling manager can generate and/or send a notification that throttling has been initiated.

If it is determined the target storage pool does have processing capacity (504: YES), then I/O manager 440 proceeds to operation 510. If it is determined the target storage pool does not have processing capacity (504: NO), then I/O manager 440 proceeds to operation 506.

At operation 506, I/O manager 440 determines if an alternate storage pool (e.g., storage pool B 430) has processing capacity. In some embodiments, the alternate storage has processing capacity if a throttle has not been initiated, or, said differently, the alternate storage does not have processing capacity if one or more throttles has been invoked. For example, if either of an IOPS throttle or a MBPS throttle is limiting data processing, then a throttle is invoked, and the related storage pool does not have processing capacity. In some embodiments, a throttling manager (e.g., throttling manager A 422) determines if the alternate storage pool has processing capacity. The throttling manager can generate and/or send a notification that throttling has been initiated.

If it determined the alternate storage pool does have processing capacity (506: YES), then I/O manager 440 proceeds to operation 508. If it is determined the alternate storage pool does not have processing capacity (504: NO), then I/O manager 440 proceeds to operation 510.

At operation 508, I/O manager 440 alters the I/O process. In some embodiments, the alteration includes sending all or a portion of the I/O commands to the alternate storage system to be processed.

In some embodiments, operation 508 can include selecting the storage pool with processing capacity as the target. This can cause the target pool and the alternate pool to temporarily or permanently switch designation. For example, assume storage pool A 420 is the target storage pool and storage pool B 430 is the alternate storage pool. The alteration would make storage pool B 430 the target storage pool for a period of time. The period of time can be a predetermined time. In some embodiments, the period of time is based on the workload at storage pool A 420. The period may last as long as throttling manager A 422 is allowing the maximum amount of processing. The period may last until the number of commands in I/O queue 423 falls below a threshold and/or is empty.

In some embodiments, operation 508 includes forward I/O commands from the target storage pool to the alternate storage pool. The alternate storage pool can return the results of the I/O command directly to the requestor (e.g., host 410). In some embodiments, the return flow path (e.g., from alternate storage pool to requestor) does not pass through the target storage pool.

In some embodiments, sending I/O commands to the alternate storage pool is in response to determining/identifying a latency benefit. A latency benefit is present when the overall latency of the alternate storage pool is less than the latency of the target storage pool. In some embodiments, I/O manager 440 calculates one or more latency values. The latency values represent a time to complete processing of an I/O command. This can include the data transferring over the network and/or waiting in a queue (or a cache). In some embodiments, latency time is calculated for data transfer between each component in computing environment 400 (e.g., host 410 to storage pool A 420, host 410 to storage pool B 430, etc.). In some embodiments, latency may include expected I/O queue 423 waiting time. A latency time can be calculated by adding all relevant latency values. For example, assume a host to target storage pool has a latency of 10 milliseconds (ms), a host to alternate storage pool has a latency of 17 ms, and the expected I/O queue wait time is 5 ms. The overall latency for keeping the I/O commands the target storage pool is 15 ms, less than the latency to send the I/O commands to the alternate storage pool. In this example, there is no latency benefit, and the I/O commands would be processed at the target storage pool. As another example, assume the latency times are the same, but the I/O queue waiting time is 10 ms. Now, the target latency is 20 ms, and the alternate latency is 17 ms, so host can send the I/O commands to the alternate storage pool, thereby reducing the overall latency of the system.

At operation 510, I/O manager 440 executes the I/O commands. The commands can be executed based on the based on the alteration, if applicable. In some embodiments, operation 510 includes notifying the requestor, execution is complete.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method to reduce Input/Output (I/O) command latency comprising:
   receiving, by a first storage pool from a first host, a plurality of I/O commands, wherein:
   the first storage pool includes a first throttling limit;
   the first throttling limit represents an amount of processing capacity of the first storage pool allotted to the first host and the first throttling limit is configured to ensure a minimum processing capacity allotted to the second host is available to the second host; and the first throttling limit is less than the total processing capacity of the first storage pool;
determining a first processing rate of the first storage pool is at the first throttling limit, wherein the first throttling limit is configured to either limit resources used by the first host;
determining a second processing rate of a second storage pool is below a second throttling limit, wherein the second storage pool is communicatively coupled to the first storage pool;
sending, in response to the first storage pool being at the first throttling limit, by the first storage pool to the second storage pool, one or more of the plurality of I/O commands;
processing, by the second storage pool, the one or more I/O commands of the plurality of I/O commands; and
returning, in response to the processing, processed I/O commands to the first host.

2. The method of claim 1 further comprising:
storing, in response determining the first storage pool is at the first throttling limit, the plurality of I/O commands in an I/O queue.

3. The method of claim 2 further comprising:
calculating a first latency, wherein the first latency represents a processing time to process the plurality of I/O commands at the first storage pool;
calculating a second latency, wherein the second latency represents the latency to process the plurality of I/O commands at the second storage pool; and
determining, the second latency is less than the first latency; and
wherein the sending is in response to determining the second latency is less than the first latency.

4. The method of claim 3, wherein the first latency includes a predicted time the plurality of I/O commands will spend waiting in the I/O queue.

5. The method of claim 1 wherein:
the plurality of I/O commands is received by a first storage controller for the first storage pool via a first network path, wherein the first network path starts at the first host and ends at the first storage pool;
the sending of the one or more I/O commands of the plurality of I/O commands to a second storage controller for the second storage pool is via a second network path, wherein the second network path starts at the first storage pool and ends at the second storage pool; and
the returning of the processed I/O commands to the first host is via a third network path, wherein the third network path starts at the second storage pool and ends at the first host.

6. The method of claim 5, wherein the first network path does not pass through the second storage controller of the second storage pool, the third network path does not pass through the first storage controller of the first storage pool, and the second network path passes through the first storage controller and the second storage controller.

7. The method of claim 1, wherein the first throttling limit is greater than the second throttling limit.

8. The method of claim 1, wherein the first storage pool and the second pool are part of a multi-site storage system.

9. The method of claim 1 wherein the first throttling is based on a number of I/Os per second (IOPS).

10. The method of claim 1, wherein the first throttling limit is based on a number of megabytes per second (MBPS).

11. A system to reduce Input/Output (I/O) latency comprising:
a processor;
a multi pool storage system including a first storage pool and a second storage pool; and
a computer-readable storage medium communicatively coupled to the processor and storing program instructions which, when executed by the processor, are configured to cause the processor to:
receive, by a first storage pool from a first host, a plurality of I/O commands, wherein:
the first storage pool includes a first throttling limit;
the first throttling limit represents an amount of processing capacity of the first storage pool allotted to the first host and the first throttling limit is configured to ensure a minimum processing capacity allotted to the second host is available to the second host; and
the first throttling limit is less than the total processing capacity of the first storage pool;
determine a first processing rate of the first storage pool is at the first throttling limit, wherein the first throttling limit is configured to either limit resources used by the first host;
determine a second processing rate of the second storage pool is below a second throttling limit, wherein the second storage pool is communicatively coupled to the first storage pool;
send, in response to the first storage pool being at the first throttling limit, by the first storage pool to the second storage pool, one or more of the plurality of I/O commands;
process, by the second storage pool, the one or more I/O commands of the plurality of I/O commands; and
return, in response to the processing, processed I/O commands to the first host.

12. The system of claim 11, wherein the program instructions are further configured to cause the processor to:
store, in response determining the first storage pool is at the first throttling limit, the plurality of I/O commands in an I/O queue.

13. The system of claim 12, wherein the program instructions are further configured to cause the processor to:
calculate a first latency, wherein the first latency represents a processing time to process the plurality of I/O commands at the first storage pool;
calculate a second latency, wherein the second latency represents the latency to process the plurality of I/O commands at the second storage pool; and
determine, the second latency is less than the first latency, wherein the sending is in response to determining the second latency is less than the first latency.

14. The system of claim 13, wherein the first latency includes a predicted time the plurality of I/O commands will spend waiting in the I/O queue.

15. The system of claim 11, wherein:
the plurality of I/O commands are received by a first storage controller for the first storage pool via a first network path, wherein the first network path starts at the first host and ends at the first storage pool;
the one or more I/O commands of the plurality of I/O commands are sent to a second storage controller for the second storage pool is via a second network path, wherein the second network path starts at the first storage pool and ends at the second storage pool; and
the processed I/O commands are returned to the first host is via a third network path wherein the third network path starts at the second storage pool and ends at the first host.

16. A computer program product to reduce Input/Output (I/O) latency, the computer program product comprising a computer readable storage medium having program instructions embodied therewith, the program instructions executable by a processing unit to cause the processing unit to:
- receive, by a first storage pool from a first host, a plurality of I/O commands, wherein: the first storage pool includes a first throttling limit; the first throttling limit represents an amount of processing capacity of the first storage pool allotted to the first host and the first throttling limit is configured to ensure a minimum processing capacity allotted to the second host is available to the second host; and
- the first throttling limit is less than the total processing capacity of the first storage pool;
- determine a first processing rate of the first storage pool is at the first throttling limit, wherein the first throttling limit is configured to either limit resources used by the first host;
- determine a second processing rate of the second storage pool is below a second throttling limit, wherein the second storage pool is communicatively coupled to the first storage pool;
- send, in response to the first storage pool being at the first throttling limit, by the first storage pool to the second storage pool, one or more of the plurality of I/O commands;
- process, by the second storage pool, the one or more I/O commands of the plurality of I/O commands; and
- return, in response to the processing, processed I/O commands to the first host.

17. The computer program product of claim 16, wherein the program instructions are further configured to cause the processing unit to:
- store, in response determining the first storage pool is at the first throttling limit, the plurality of I/O commands in an I/O queue.

18. The computer program product of claim 17, wherein the program instructions are further configured to cause the processing unit to:
- calculate a first latency, wherein the first latency represents a processing time to process the plurality of I/O commands at the first storage pool;
- calculate a second latency, wherein the second latency represents the latency to process the plurality of I/O commands at the second storage pool; and
- determine, the second latency is less than the first latency, wherein the sending is in response to determining the second latency is less than the first latency.

19. The computer program product of claim of claim 16, wherein:
- the plurality of I/O commands are received by a first storage controller for the first storage pool via a first network path, wherein the first network path starts at the first host and ends at the first storage pool;
- the one or more I/O commands of the plurality of I/O commands are sent to a second storage controller for the second storage pool is via a second network path, wherein the second network path starts at the first storage pool and ends at the second storage pool; and
- the processed I/O commands are returned to the first host is via a third network path, wherein the third network path starts at the second storage pool and ends at the first host.

* * * * *